H. L. BOWERS.
MOTOR BOAT.
APPLICATION FILED SEPT. 25, 1915.
1,192,378.
Patented July 25, 1916.
4 SHEETS—SHEET 4.
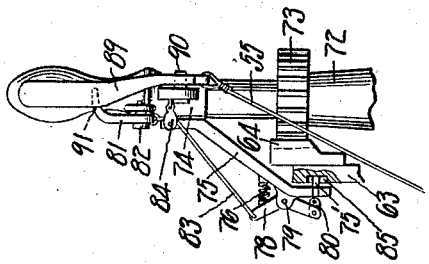
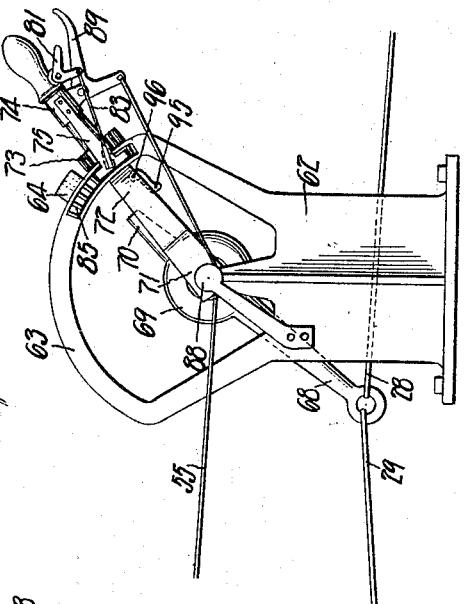
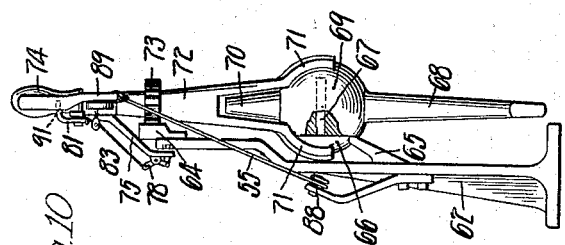
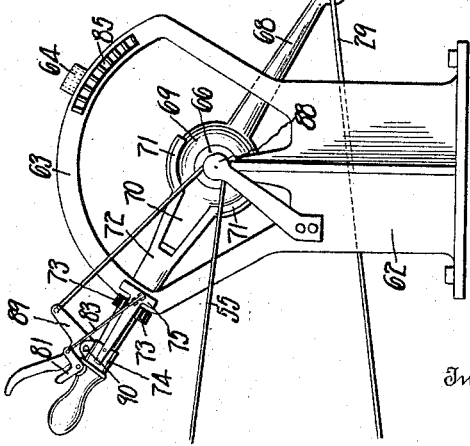
Inventor
Harry L. Bowers,
By Pagelsen & Spencer,
Attorneys
Witness
E. R. Barrett

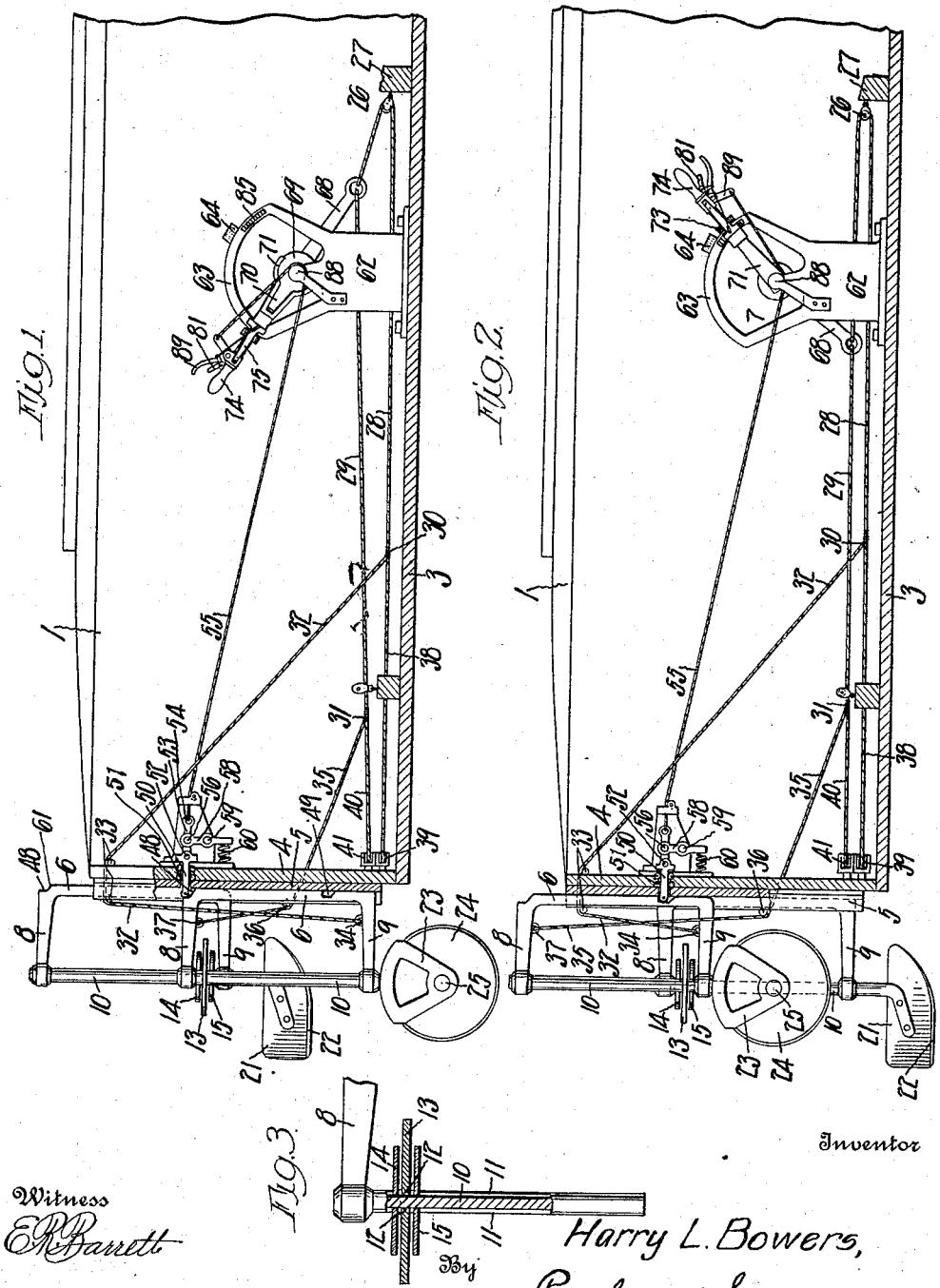

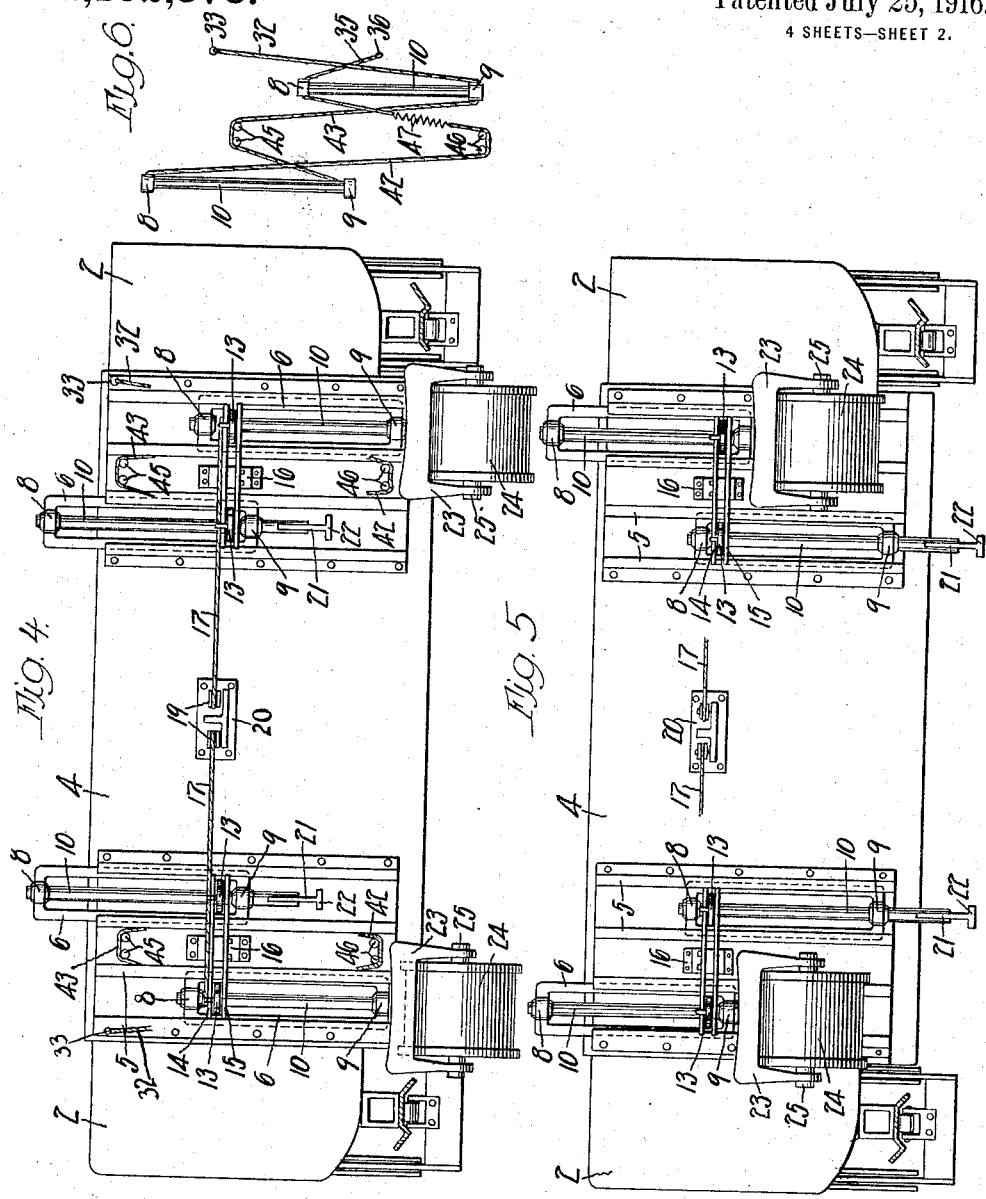

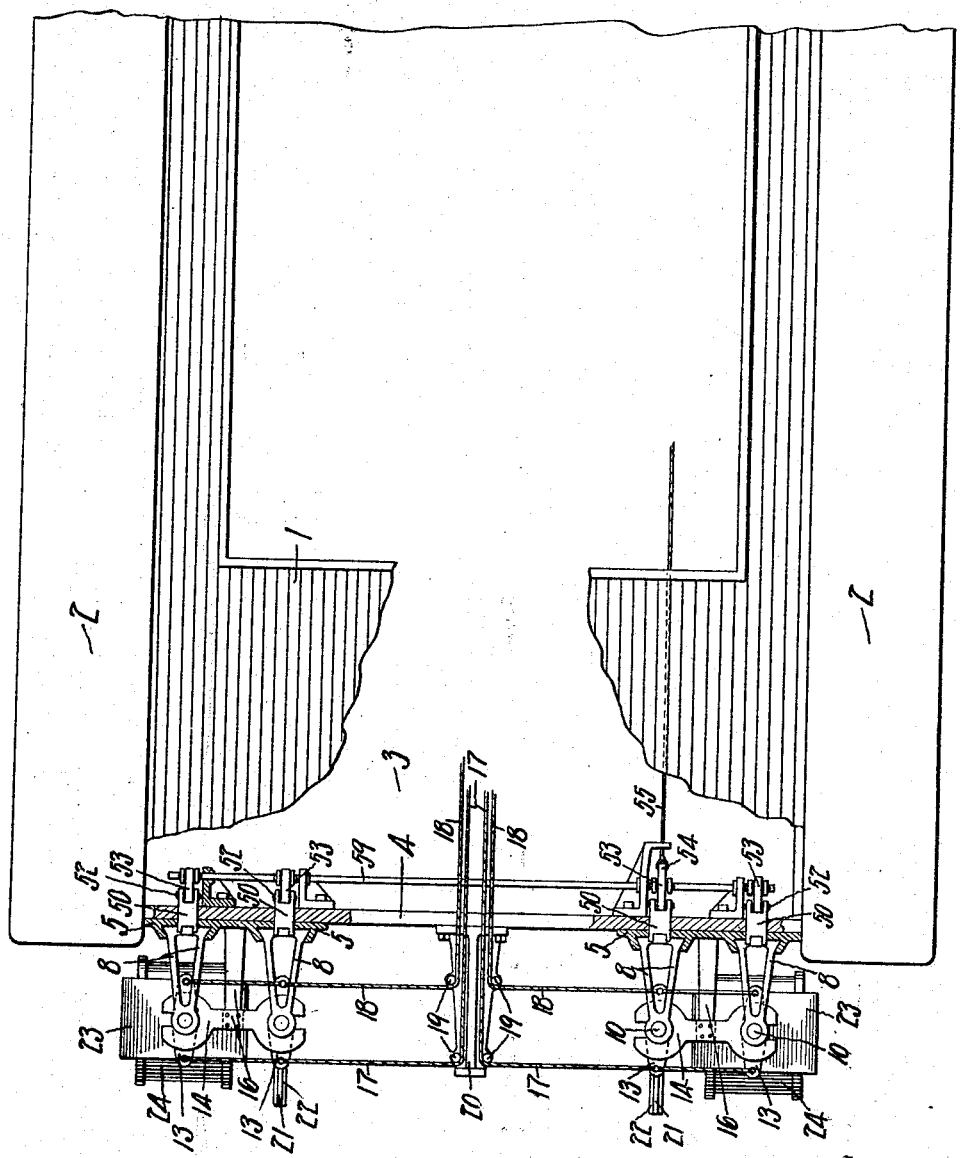

UNITED STATES PATENT OFFICE.

HARRY L. BOWERS, OF BAY CITY, MICHIGAN.

MOTOR-BOAT.

1,192,378.

Specification of Letters Patent.

Patented July 25, 1916.

Application filed September 25, 1915. Serial No. 52,593.

*To all whom it may concern:*

Be it known that I, HARRY L. BOWERS, a citizen of the United States, and a resident of Bay City, in the county of Bay and State of Michigan, have invented a new and Improved Motor-Boat, of which the following is a specification.

This invention relates to motor boats— more particularly to that type of motor boat which is capable of propelling itself on land, or in water, either shallow or deep—and among its important features are the following: interchangeable steering means including two sets of steering mechanisms, one set comprising spaced rudders and the other set including spaced supporting wheels, together with means whereby either rudders or wheels may be raised or lowered as desired; locking mechanism for retaining either set of steering devices out of the way when not in use and for holding the other set in operative position; a single lever for controlling the steering and locking mechanisms; and means for automatically releasing the rudders in case the boat strikes the ground at a speed great enough to endanger breakage.

The invention also consists in the details of construction shown, described and claimed.

In the drawings, Figure 1 is a longitudinal section through the rear end of a motor boat equipped with one embodiment of my invention, the parts being in position to travel in shallow water or on land. Fig. 2 is a similar view, the parts being arranged to travel in the water. Fig. 3 is a fragmentary vertical section through one of the steering posts. Fig. 4 is a rear elevation corresponding to Fig. 1. Fig. 5 is a similar view corresponding to Fig. 2. Fig. 6 is a diagrammatic elevation showing the arrangement of the shifting cables. Fig. 7 is a plan view, parts being broken away. Fig. 8 is a side elevation of the control lever and support therefor in the position assumed when the rudders are raised. Fig. 9 is a similar view, the rudders being lowered. Fig. 10 is an end view corresponding to Fig. 9. Fig. 11 is an enlarged fragmentary view showing the lever locked to the segment.

In the embodiment of the invention shown, 1 indicates the rear portion of the hull of a motor boat equipped with mechanism (which may be inclosed in the propeller boxes 2) suitable for propelling it in water, either deep or shallow, or on land, that disclosed in my United States Letters Patent Number 1,123,230, of January 5, 1915, being deemed preferable. The hull includes the bottom 3 and end 4.

Mounted to slide vertically in the guides 5 on the outer side of the end are the brackets 6 (preferably dovetailed therein) each of which has the upper and lower rearwardly projecting arms 8 and 9; these arms support the steering posts 10 that are provided with keyways 11 (Fig. 3) in which the keys 12 on the tillers 13 are received. The tillers are prevented from rising or falling by the spaced arms 14 and 15 on the brackets 16 (Figs. 4 and 5) that are secured to the end 4 between each pair of guides 5, and the several tillers may be swung simultaneously by cables 17 and 18 (Fig. 7) that pass over the pulleys 19 on a bracket 20 and from thence to the vicinity of the operator.

One pair of the steering posts (as shown, the inner pair) has rigid with its lower end runner-shaped rudders 21, each of which is provided with a flange 22 whereby a relatively broad surface is secured for contact with the ground in shallow water; the other pair carry the divided wheel brackets 23 in which the wheels 24 are mounted on the axles 25. The wheels may be elevated and the rudders simultaneously lowered by a looped cable (in effect) (Figs. 1 and 2) that passes over a pulley 26 anchored at 27, and has its ends 28 and 29 divided at 30 and 31, respectively. One division 32 of the end 28 passes over the pulleys or guides 33, then downwardly to the arm 9 of one of the wheel brackets 6 to which it is secured at 34; a division 35 of the end 29 passes out through the end of the boat and over pulley or guide 36 to the point 37, where it is attached to the upper arm 8 of the same bracket. The other division 38 of the end 28 is continued laterally through guides 39 and has its end secured to the lower arm of the other wheel bracket while the division 40 is continued through similar guides 41 and attached to the upper arm 9 of the same wheel bracket in an obvious manner. Thus it will be seen that as the end 28 of the cable is pulled to the right (Fig. 1), the wheel brackets are raised, and that a corresponding pull on the end 29 causes them to be lowered. Each of these movements is communicated in the reverse direction to the adjacent rudder bracket by means of the crossed cables 42 and 43 (Fig. 6), the ends of which are attached, respectively, to the upper and lower arms of the wheel and rudder brackets, the intermediate portions passing over pulleys or guides 45 and 46 supported on the end of the boat. The members of each pair of steering devices are, therefore, simultaneously raised or lowered at the same time that the members of the other pair are lowered or raised. The cables 42 are preferably provided with the spring section 47, the function of which will be explained later.

For the purpose of retaining the steering mechanisms in upper and lower positions, the front faces of the brackets 6 are notched near the top and bottom at 48 and 49, and the end 4 and guides 5 are pierced to receive the reciprocable latch bolts 50 that may slide in anti-friction bearings 51. The latch bolts are pivoted at 52 to links 53 (one of which has an eye 54 to which an operating cable 55 is attached), and the latter are pivotally connected at 56 to corresponding levers 58, rigid with a shaft 59 that extends crosswise of the end of the boat. One or more of these levers is provided with a spring 60 that tends to thrust the latch bolts rearwardly. The lower edge of the upper notch in each of the rudder brackets is inclined downwardly and forwardly as shown at 61 for a purpose hereinafter indicated.

The cables 28—29—55 may be actuated in various ways, but for reasons that will appear later, the mechanism shown in Figs. 1, 2 and 8 to 11, inclusive, is preferred. In these figures 62 indicates a bracket bolted to the bottom of the boat and including a segment 63 which is provided near its rear end with a short rack 64. Also projecting from the bracket on the same side as the rack is an arm 65, the end of which is in the form of a spherical segment 66 (Fig. 10), and from the center of the segment a pivot 67 extends horizontally to afford a bearing for a lever section 68, to which the cables 28—29 are attached, said section including a spherical segment 69 (the rest of the sphere of which 66 is a part) and a preferably conical upper end 70. The sphere 66—69 is embraced by the divisions 71 of the lower end of a rotatable lever section 72 that includes a gear or gear segment 73 arranged to engage the rack 64. When the section 72 is in the position shown in Fig. 8, that is, when the steering wheels are down, the section 68 is rigidly coupled to it for swinging movement about the pivot 67; when, however, the section 72 is swung 90° about its axis, which takes place automatically by engagement of the gear 73 with the rack 64, (Figs. 9-10), the section 68 may have independent movement about the pivot, since the portion 70 may then swing through between the divisions 71. The upper end of the section 72 is revoluble in a handle section 74 that is held from revolution by the guard arm 75, the end of which is in sliding engagement with the segment 63. A locking bolt 75' (Fig. 11), carried by the lower end of the guard arm, is thrust toward the segment by the spring 76, lever 78 (pivoted to the guard arm at 79) and link 80; and a lever 81 pivotally mounted on the handle section 74 at 82, together with the wire 83 and guide 84, serves to withdraw the bolt against the force of the spring. When in the position shown in Figs. 9 and 11, the bolt 75 engages one of the notches 85 formed in the segment 62 and retains the lever sections 72—74 against swinging movement about the pivot 67.

The latch-releasing cable 55 leads about a guide 88 on the bracket 62 to a hand lever 89, pivoted on the lever section 74 at 90, and the guard arm releasing lever 81 has its end 91 bent over into the path of the hand lever, as best shown in Fig. 11.

Operation: The operation of the device may be considered under two heads: first, with reference to the automatic action when the rudders strike an obstruction, and second, with regard to landing and to the use of the wheels for steering purposes in shallow water, on land, or in landing. Assuming that the boat is traveling in water of considerable depth, the parts occupy the positions indicated in Figs. 2, 5, 9, 10 and 11, from which it will be seen that the section 68 of the operating lever has been automatically disconnected from the sections 72—74 in swinging from the position shown in Fig. 8, leaving the cables 28—29 free to work back and forth. The rudder brackets are then locked in lowered position by the bolts 50. Should the runner-shaped rudders strike a submerged obstruction, the springs 47 tend to absorb the shock and allow them to rise slightly; should the contact be so great, however, as to endanger breakage, the upward thrust of the inclined face 61 of the rudder bracket causes the corresponding latch-bolt 50 to be thrust forwardly—an action which is transmitted, by means of the shaft 59, to the other bolts, thus releasing the whole steering mechanism. The wheels 24 being heavier than the rudders, thereupon drop into contact with the obstruction while the rudders rise. Since the lever section 68 is free to swing on the pivot 67 there is no danger of breakage of the control mechanism nor of injury to the operator as the section swings from the position shown in Fig. 2 to about that in Fig. 8. The rest of the lever remains in the position indicated in Figs. 2 and 9, but may again be swung rearwardly and coupled to the section 68 by pulling on the handle section 74 until it is in line with the section 68, and thereafter turning the section 72 90° into the position shown in Fig. 8—which may be accomplished by exerting pressure on the concealed handle 95 pivoted to the section 72 at 96 (Fig. 9).

Now referring to the landing operation or to the manner of getting over sand bars and like obstructions:—It is obvious that if the wheels are to be made use of as a steering medium, they must be locked in their lowermost position (Fig. 1). The parts being in the position indicated in Fig. 2, the hand lever 89 is pulled back, which causes the cable 55 to withdraw the bolts 50 and unlock the brackets, and also (because of the fact that the lever 81 projects into the path of the hand lever) releases the bolt 75' from the notches or teeth 85. The entire lever 68—72—74 is then pulled back until the wheels are in extreme low position, whereupon the hand lever 89 is released to allow the springs 60 to force the bolts 50 into the corresponding bracket-notches.

The tread of the wheels is broad enough to prevent them from sinking—especially on moist sand beaches—and the ability to use them as a steering mechanism is particularly useful when traveling in shallow streams or on sand bars or ice fields.

It is clear that many changes may be made in the construction without departing from the spirit of my invention. I do not, therefore, wish to be limited otherwise than as indicated by the subjoined claims.

I claim:—

1. A motor boat comprising a hull, a steering rudder movable between upper and lower positions thereon, a steering wheel also movable between upper and lower positions, and means for simultaneously moving the two steering devices in opposite directions.

2. A motor boat comprising a hull, a steering rudder movable between upper and lower positions thereon, a steering wheel also movable between upper and lower positions, means for simultaneously moving the two steering devices in opposite directions, and means for locking both rudder and wheel in either position.

3. A motor boat comprising a hull, a steering rudder movable from a lower to an upper position, a steering wheel movable from an upper to a lower or carrying position, means for locking the rudder in the lower position, means whereby, when the rudder is in the lower position and strikes an obstruction, the locking means is caused to release the rudder to allow the latter to rise, and means for communicating the movement of the rudder in reverse direction to the wheel to cause the latter to lower.

4. A motor boat comprising a hull, a steering rudder movable from a lower to an upper position, a steering wheel movable from an upper to a lower position, means for causing the wheel to move simultaneously with and oppositely to the rudder, said means allowing a limited initial movement of the rudder independently of the wheel.

5. A motor boat comprising a hull, a steering rudder movable between upper and lower positions thereon, a pair of laterally spaced steering wheels also movable between upper and lower positions thereon, and means for simultaneously moving the rudder and the wheels in opposite directions.

6. A motor boat comprising a hull, a steering rudder movable between upper and lower positions thereon, a pair of laterally spaced steering wheels also movable between upper and lower positions thereon, means for simultaneously moving the rudder and the wheels in opposite directions, and means for locking the wheels in lower position.

7. A motor boat comprising a hull, a steering rudder movable between upper and lower positions thereon, a pair of laterally spaced steering wheels also movable between upper and lower positions thereon, means for simultaneously moving the rudder and the wheels in opposite directions, and means for locking the rudder in lower position.

8. A motor boat comprising a hull, a steering rudder movable between upper and lower positions thereon, a pair of laterally spaced steering wheels also movable between upper and lower positions thereon, means for simultaneously moving the rudder and the wheels in opposite directions, and means for locking the wheels in upper position.

9. A motor boat comprising a hull, a steering rudder movable between upper and lower positions thereon, a pair of laterally spaced steering wheels also movable between upper and lower positions thereon, means for simultaneously moving the rudder and wheels in opposite directions, and means for locking the rudder in upper position.

10. A motor boat comprising a hull, a pair of laterally spaced steering rudders movable between upper and lower positions thereon, a pair of laterally spaced steering wheels also movable between upper and lower positions thereon, and means for simultaneously moving the rudder and the wheels in opposite directions.

11. A motor boat comprising a hull, a steering rudder movable from a lower or steering position to an upper position thereon, means tending to hold the rudder in lower position, said means including a spring that allows a limited upward movement of the rudder when the latter strikes an obstruction, and a locking mechanism, said locking mechanism being unlocked by the rudder as it reaches the end of the limited upward movement, whereby breakage is avoided.

12. A motor boat comprising a hull, a steering rudder movable between upper and lower positions thereon, a pair of laterally spaced steering wheels also movable between upper and lower positions thereon, means for simultaneously moving the rudder and the wheels in opposite directions, and means for locking the rudder in lower position, said locking means being arranged to release the rudder when the latter strikes an obstruction with force sufficient to endanger breakage of the parts.

13. A motor boat comprising a hull, a pair of laterally spaced guides thereon, a pair of wheel brackets slidable up and down therein, steering posts mounted in the brackets, a steering wheel carried at the lower end of each post, another guide located between the first mentioned guides, a rudder bracket slidable up and down therein, a steering post mounted in the last named bracket, a rudder carried at the lower end of the last named post, means for simultaneously lowering the wheels and elevating the rudder, and means for turning the steering posts to steer the boat.

14. A motor boat comprising a hull, a substantially vertical guide thereon, a steering rudder bracket movable in the guide between upper and lower positions, a rudder rotatably mounted in the bracket, a bolt carried by the guide, said bracket having a socket in which the end of the bolt is received when the rudder is in lower position, and said socket including a downwardly inclined lower face whereby, when the rudder encounters an obstruction, the bolt is wedged out of the socket and the bracket released for rising movement.

15. A motor boat comprising a hull, a steering rudder movable between upper and lower positions thereon, means for raising or lowering the rudder, said means including a divided cable, a locking mechanism tending to hold the rudder in lowered position, said locking mechanism being arranged to release the rudder for rising movement when the latter contacts with an obstruction, and a two-part lever, the first part of which is connected to the divided cable, the second part having a handle, said lever including means for coupling the parts together for movement in one direction to lower the rudder and for automatically uncoupling the parts thereafter to allow free movement of the part connected to the cable when the rudder rises, whereby danger to an operator who may be grasping the handle is avoided.

16. A motor boat comprising a hull, a pair of laterally spaced wheels movable between upper and lower positions thereon, a steering rudder located between the wheels and also movable between upper and lower positions, means for raising or lowering the rudder and for simultaneously lowering or raising the wheels, said means including a divided cable, a locking mechanism tending to hold the rudder in lowered position, said locking mechanism being arranged to release the rudder for rising movement when the latter contacts with an obstruction, and a two-part lever, the first part of which is connected to the divided cable, the second part having a handle, said lever including means for coupling the parts together for movement in one direction to lower the rudder and for automatically uncoupling the parts thereafter to allow free movement of the part connected to the cable when the rudder rises, whereby danger to an operator who may be grasping the handle is avoided.

17. A motor boat comprising a hull, a steering rudder movable between upper and lower positions thereon, means for raising or lowering the rudder, said means including a divided cable, a locking mechanism tending to hold the rudder in lowered position, said locking mechanism being arranged to release the rudder for rising movement when the latter contacts with an obstruction, and a two-part lever, the first part of which is connected to the divided cable, said first part including a pivotally mounted spherical segment and a projecting portion, the second part of the lever including a handle and having a divided socket embracing the spherical segment, said second part being rotatable on the segment from a position in which it is coupled to the first part by means of the divided socket and the projection, for pivoted movement therewith to a position in which the first part may swing independently of the second part, whereby the rudder may rise upon being released from the locking mechanism.

18. A motor boat comprising a hull, a steering rudder movable between upper and lower positions thereon, means for raising or lowering the rudder, said means including a divided cable, a locking mechanism tending to hold the rudder in lowered position, said locking mechanism being arranged to release the rudder for rising movement when the latter contacts with an obstruction, and a two-part lever, the first part of which is connected to the divided cable, the second part including a handle and being rotatable on the first part, the parts including means whereby they are coupled together when in one position of rotation and whereby the first part is automatically uncoupled from the second part in another position of rotation, means for automatically rotating the second part into the last named position when the rudder is lowered.

19. A motor boat comprising a hull, a steering rudder movable between upper and lower positions thereon, means for raising or lowering the rudder, said means including a divided cable, a locking mechanism tending to hold the rudder in lowered position, said locking mechanism being arranged to release the rudder for rising movement when the latter contacts with an obstruction, and a two-part lever, the first part of which is connected to the divided cable, the second part including a handle and being rotatable on the first part, the parts including means whereby they are coupled together when in one position of rotation and whereby the first part is automatically uncoupled from the second part in another position of rotation, means for automatically rotating the second part into the last named position when the rudder is lowered, and means for locking the second part in uncoupled relation to the first part.

20. A motor boat comprising a hull, a steering rudder movable between upper and lower positions thereon, means for raising or lowering the rudder, said means including a divided cable, a locking mechanism tending to hold the rudder in lowered position, said locking mechanism being arranged to release the rudder for rising movement when the latter contacts with an obstruction, and a two-part lever, the first part of which is connected to the divided cable, the second part including a handle and being rotatable on the first part, the parts including means whereby they are coupled together when in one position of rotation and whereby the first part is automatically uncoupled from the second part in another position of rotation, means for automatically rotating the second part into the last named position when the rudder is lowered, means for locking the second part in uncoupled relation to the first part, and means carried by the lever for manually releasing the rudder locking means.

21. A motor boat comprising a hull, a steering rudder movable between upper and lower positions thereon, means for raising or lowering the rudder, said means including a divided cable, a locking mechanism tending to hold the rudder in lowered position, said locking mechanism being arranged to release the rudder for rising movement when the latter contacts with an obstruction, and a two-part lever, the first part of which is connected to the divided cable, the second part including a handle and being rotatable on the first part, the parts including means whereby they are coupled together when in one position of rotation and whereby the first part is automatically uncoupled from the second part in another position of rotation, means for automatically rotating the second part into the last named position when the rudder is lowered, means for locking the second part in uncoupled relation to the first part, means carried by the lever for manually releasing the rudder locking means, and means also carried by the lever for simultaneously releasing the second part of the lever.

22. A motor boat comprising a hull, a pair of substantially vertical guides thereon, a rudder movable in one of the guides, a steering wheel movable in the other, means for raising and lowering one of the steering devices, and means for simultaneously lowering and raising the other steering device, said last mentioned means including a pair of cables secured to each of the devices, and guides whereby the effective application of the cables to the two devices is reversed.

In testimony whereof I sign this specification.

HARRY L. BOWERS.